Jan. 18, 1949.    W. W. HALLINAN    2,459,376
FILTER
Filed Feb. 9, 1944    4 Sheets-Sheet 2

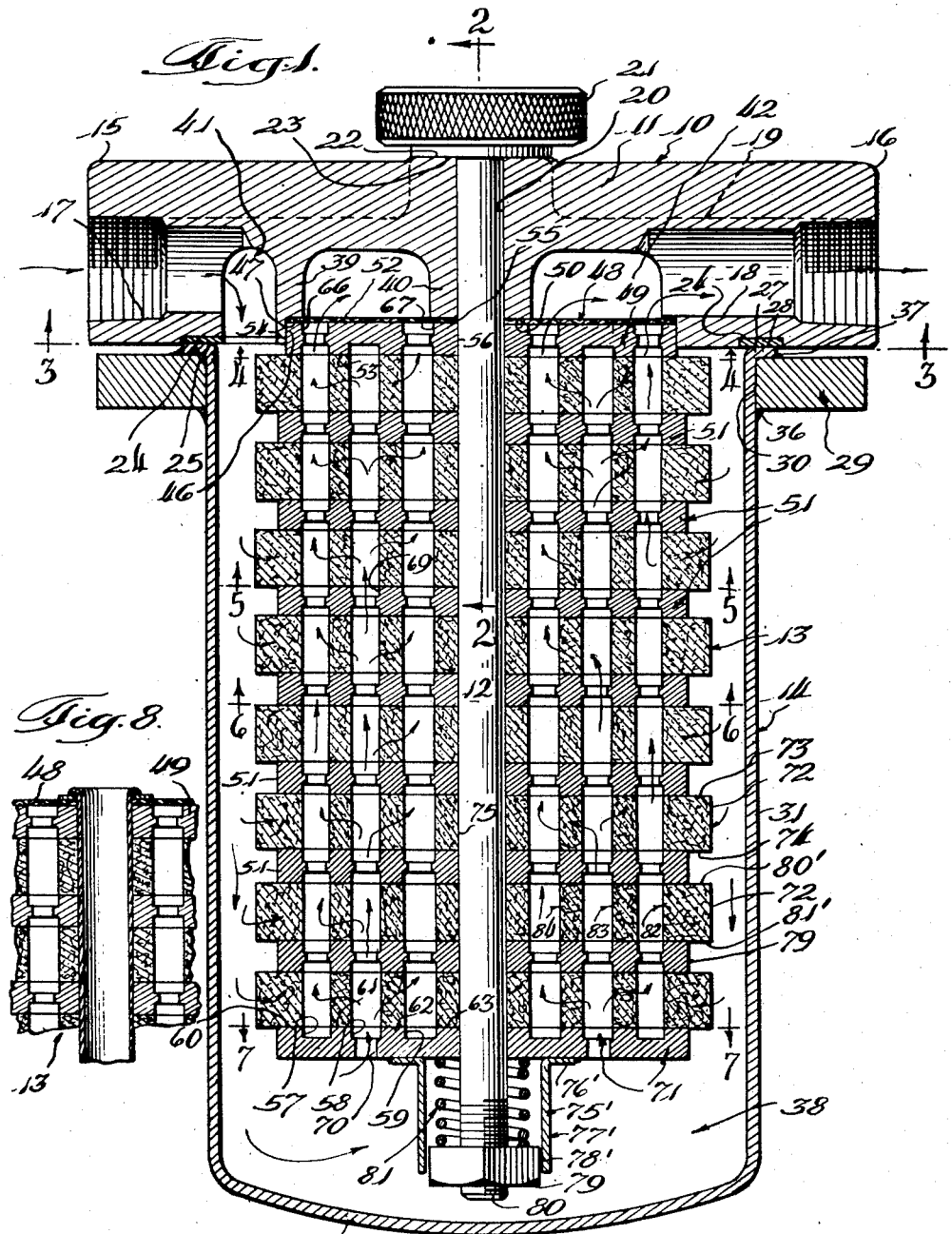

Inventor
William W. Hallinan
By McCaleb, Hewitt & Dickinson
Attorneys

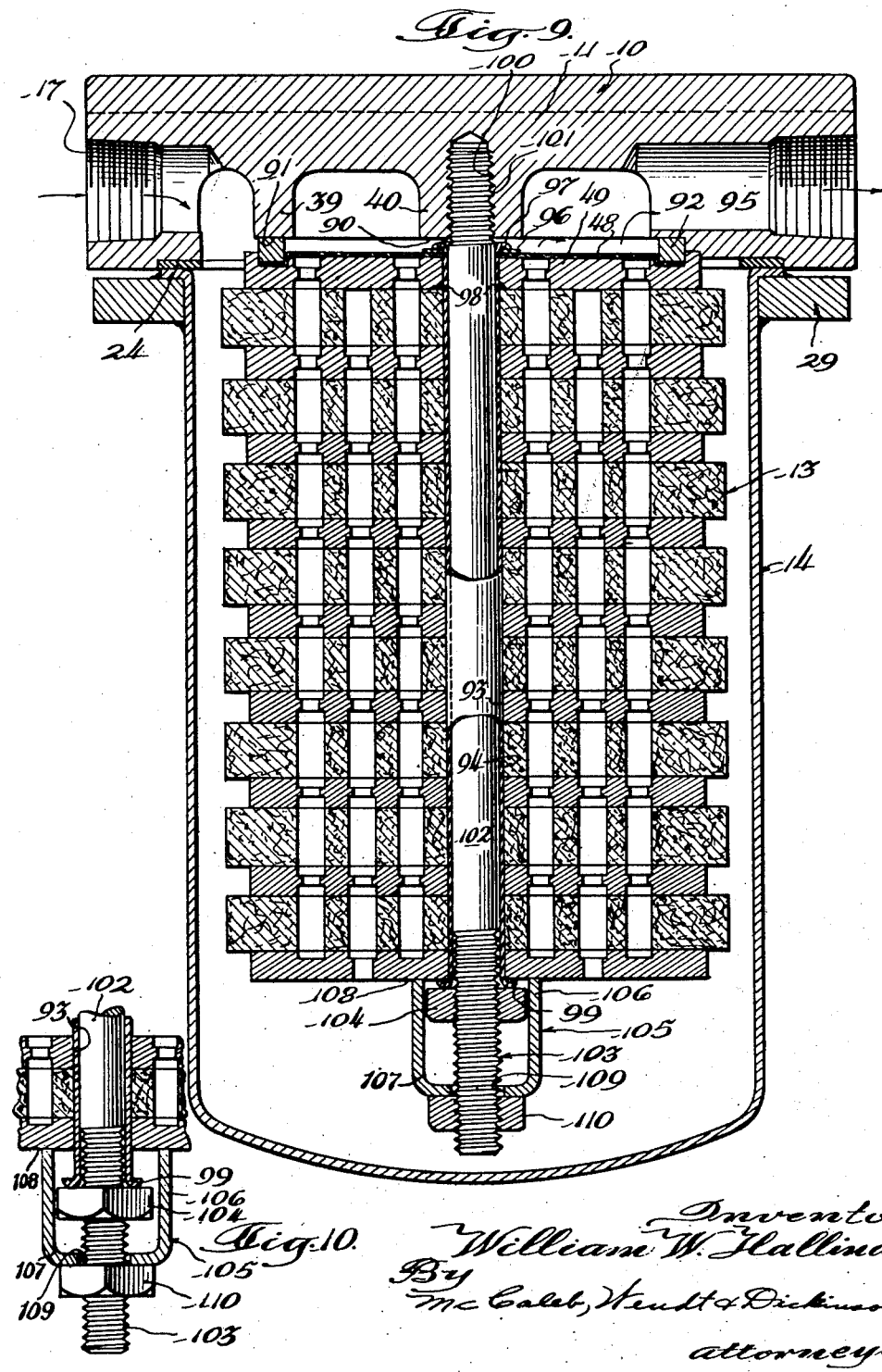

Patented Jan. 18, 1949

2,459,376

UNITED STATES PATENT OFFICE 2,459,376

FILTER

William W. Hallinan, Racine, Wis.

Application February 9, 1944, Serial No. 521,598

5 Claims. (Cl. 210—120)

The present invention relates to filters, and is particularly concerned with filters which are adapted to be used for filtering liquids, gas, or air.

The present application is a continuation-in-part of my prior application, Ser. No. 441,077 for Filters, filed April 30, 1942, and now Patent Number 2,389,431. This application relates to another modification.

One of the objects of the invention is the provision of an improved filter of the disc type, which is adapted to be used for filtering and removal of solids from liquids, air, or other gases, and in which the filtering elements are adapted to be replaced with a minimum amount of labor.

Another object of the invention is the provision of an improved filter of the class described, which is provided with a greater filtering area and which may be made more compact for the same filtering area than devices of the prior art, so that it is adapted to be used where space is at a premium, and may be employed wherever such filters are needed, such as, on automobile engines, oil burners, or humidifying devices.

Another object of the invention is the provision of an improved filter structure which is capable of providing a greater filtering surface in a smaller space than the devices of the prior art, and which is less expensive to manufacture, and which utilizes filtering elements that may be stamped or punched out of sheet material by means of a press.

Another object of the invention is the provision of an improved filter structure which is adapted to be cleaned quickly and easily, and provided with new filter elements, and in which the filter elements are made of flat or sheet material that are easily packed and carried by service men, or in which a temporary repair job can be made by cutting out pads from any sheet material, such as cotton or wool felt or cotton or wool cloth or paper.

Another object of the invention is the provision of an improved filter structure by means of which the density of the filter elements may be adjusted so that a loose adjustment may be provided to allow small particles of foreign substances to pass, if they are not liable to cause any damage, and which is still adapted to filter out the larger particles, or which may be adjusted to so increase the density of the filter element that even the smallest particles of foreign substances will be caught in the filter.

Another object of the invention is the provision of an improved filter structure so constructed that it can be cleaned, serviced, or provided with new filter elements, without disturbing the connected inlet and outlet piping connections, and in which one bolt may be used first to hold the filter pads and supporting discs together and provide the density adjustment.

Another object of the invention is the provision of an improved filter structure employing filter elements made of felt or other fibrous material, which are apt to have a fine fuzz, or where part of the filter elements might become detached and pass into the circulating system, which is provided with means for filtering out such fuzz or other detached elements and for completely clarifying the filtered liquid or gas.

Another object of the invention is the provision of an improved filter element structure which is peculiarly adapted to be removed or installed as a unit, but which also permits the application of a variable pressure to the filter elements in the assembly so as to adapt the filter to various uses.

Other objects and advantages of the invention will be apparent from the following description and the accompanying drawings, in which similar characters of reference indicate similar parts throughout the several views.

Referring to the four sheets of drawings accompanying this specification,

Fig. 1 is an axial sectional view, taken through a filter constructed according to the invention, on a plane which coincides with the axes of the inlet and outlet;

Fig. 8 is a fragmentary sectional view, showing the construction of the central part of a filter cartridge mounted upon a tubular member so that the complete filter assembly may be removed and replaced as a unit.

Fig. 9 is a sectional view, taken on a plane passing through the axes of the inlet and outlet and the securing bolt of the filter assembly; and Fig. 10 is a fragmentary sectional view taken on the same plane, showing the position which the parts assume when additional pressure is placed upon the filter assembly.

Referring to Fig. 1, 10 indicates in its entirety the filter unit, which preferably comprises a supporting base 11 provided with a threaded member 12 for holding the filter elements 13, and provided with a cover member 14 for enclosing the filter assembly.

Figure 3:
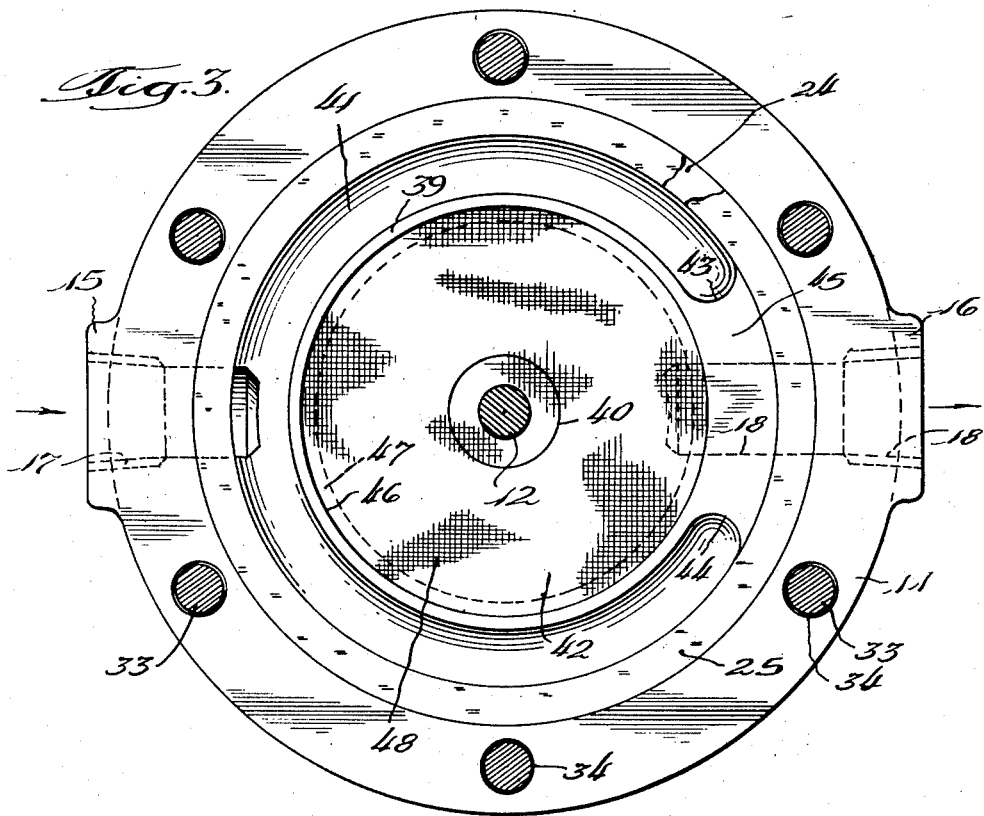
Fig. 3 is a full sized sectional view, taken on the plane of the line 3—3 of Fig. 1, looking in the direction of the arrows, showing the inlet and outlet.

The base member or supporting body 11 may consist of a cast metal member, preferably of circular shape, as shown in Fig. 3, except for radially projecting portions 15, 16 at the inlet 17 and outlet 18. The base member 11 may be provided with a plane upper surface 19 and with a centrally located bore 20 for passing the screw bolt 12, which preferably has a knurled head 21.

The base 11 also has a machined thrust surface 22 surounding the bore 20, for engaging the annular thrust surface 23 on the bottom of the head 21. The inlet 17 and outlet 18 are preferably provided with pipe threads or other means for connecting to the pipes, which conduct the liquid or gas which is to be filtered; and the base 11 is provided on its lower side with an annular machined gasket-receiving surface 24 for engaging one side of the gasket 25, the other side being engaged by the cover 14.

The cover 14 may consist of a stamped or drawn sheet metal member of substantially cylindrical shape provided with an end wall 26, which is outwardly conxev. At its open end the cover 14 is provided with an outwardly extending radial flange 27, the upper surface 28 of which is seated against the gasket 25.

The gasket 25 may be made of rubber or any other suitable material for effecting a tight seal against the passage of liquids or gas.

The cover 14 is held on the base 11 by a thrust collar 29, which may consist of an annular cast metal member having a bore 30 adapted to receive the cylindrical portion 31 of the cover 14. The thrust collar 29 may be rectangular in cross section, as shown in Fig. 1, and it is preferably provided with a plurality of threaded bores 32 regularly and equally spaced about the thrust collar 29 in such manner that they may receive the threaded screw bolts 33, which pass through the apertures 34 in the base 11 (Fig. 2).

The apertures 34, of course, are so aranged that they do not interefer with the inlet 17 and outlet 18, and the cover 14 may be secured to the base 11 by threading the screw bolts 33 into the threaded bores 32 in the collar 29, effectively clamping the flange 27 against the gasket 25.

Figure 2:
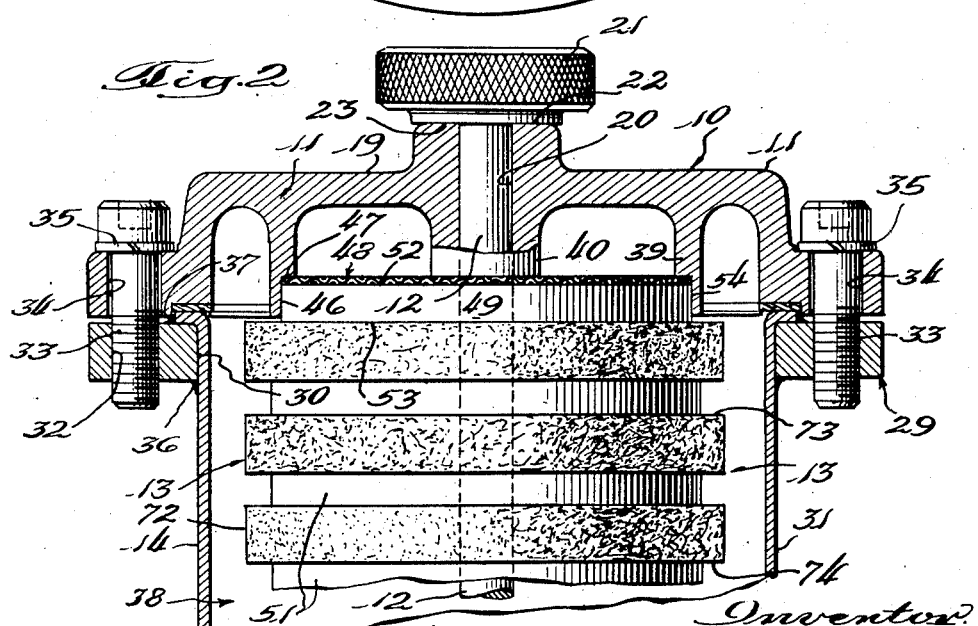
Fig. 2 is a similar fragmentary sectional view, showing the details of structure of the auxiliary filter member, which filters out any fuzz or other parts that may become detached from the fibrous filter elements.
Figure 4:
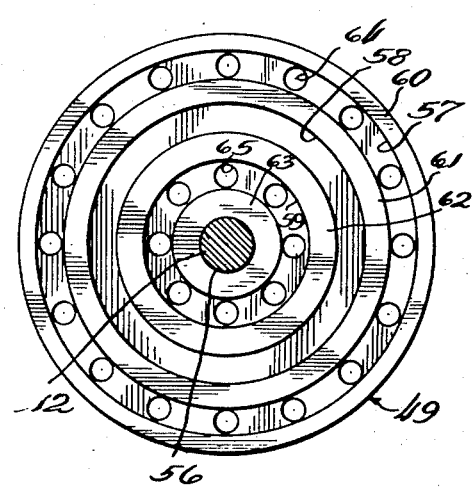
Fig. 4 is a sectional view, taken on the plane of the line 4—4 of Fig. 1, looking in the direction of the arrows, and showing the arrangement of the apertures in the uppermost pressure plate.
Figure 5:
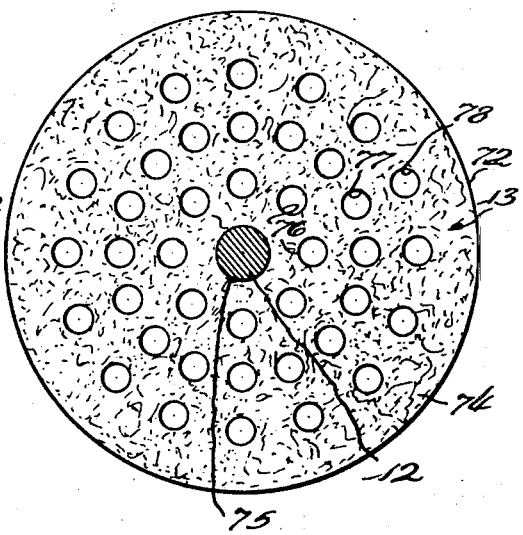
Fig. 5 is a sectional view, taken on the plane of the line 5—5 of Fig. 1, looking in the direction of the arrows, showing the structure of one of the filter elements.
Figure 6:
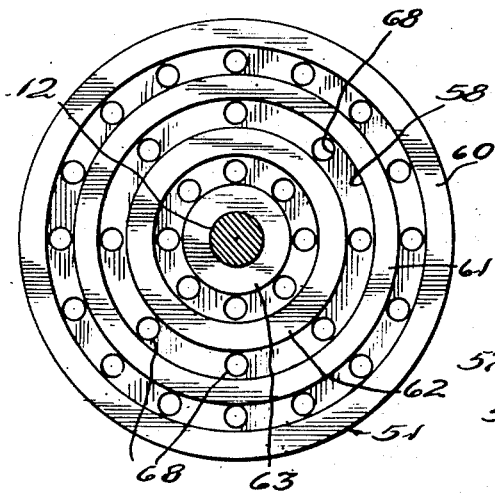
Fig. 6 is a sectional view, taken on the plane of the line 6—6 of Fig. 1, looking in the direction of the arrows, showing the structure of one of the intermediate pressure plates.

The bolts 33 may be provided with spring-like washers 35, and the collar 29 is preferably soldered or welded to the cover 14 at the points 36, 37 (Fig. 2).

Inside the filter chamber 38, which is formed by the base 11 and the cover 14, the base 11 is provided with another axially projecting annular wall or partition 39, which is concentric with respect to the centrally located hub 40 that surrounds the bore 20.

The partition 39 separates the lower part of the base 11 into an inlet chamber or conduit 41 and an outlet chamber or conduit 42. The inlet conduit 41 is in the form of a partially annular groove, which terminates at 43, 44 and communicates with the inlet 17, and the base has a body portion 45, which extends across the groove 41 and is provided with a through bore 18, previously identified as the outlet.

The through bore 18 communicates with the inner annular space 42, which surrounds the hub 40 and forms a part of an outlet conduit.

The annular partition 39 may be provided with a counterbore 46 and a seating surface 47 for receiving the uppermost filter cloth 48 and the uppermost pressure plate 49.

The hub at 40 may be provided with a plane end surface 50 for engaging this filter cloth 48.

The upper pressure plate 49 differs from the intermediate pressure plates 51 in the arrangement of its apertures for proper direction of flow of the liquid or gas to be filtered. Thus the pressure plate 49 comprises a circular disc, which may be made of metal, or which may be molded out of a suitable plastic; and it is provided with upper and lower plane surfaces 52, 53 and with the external cylindrical surface 54 at its edge.

The cylindrical surface 54 fits in the counterbore 46. This pressure plate is adapted to clamp the filter cloth 48 in its place. The filter cloth 48 may comprise a tightly woven filtering cloth, such as a shaker cloth, or cotton flannel; and this cloth is clamped in its recess by the plate 49. It is circular in shape, fitting in the counterbore 46, and it has a centrally located aperture 55 for passing the screw bolt 12.

The upper pressure plate 49 has a similar aperture 56 for the same purpose, and it is provided with a plurality of annular grooves 57, 58, 59, which may be separated by raised portions or lands 60, 61, 62, 63 on its lower surface.

The grooves 57 and 59 are provided with a multiplicity of regularly spaced through apertures 64, 65, which may be circular bores, and which are adapted to convey the liquid or gas to be filtered through this plate into proper channels.

On its upper side, since this plate does not have any apertures in the groove 58, that groove may be eliminated, but the upper side has the grooves 66, 67, which are in alignment with the apertures 64, 65 and the lower grooves 57, 59.

The intermediate pressure plates 51 may be similar in structure, except that they are provided with additional apertures 68 extending from the lower groove 58 to the upper groove 69. The annular grooves in these pressure plates serve the useful purpose of conducting the liquid or gas to be filtered to the apertures in the filter elements 13, although the apertures in the filter elements may not be aligned with the apertures of the pressure plates.

Furthermore, the raised portions or lands 60, 61, 62, 63 serve the purpose of increasing the local pressure on the filter elements at points between the apertures or conduits in these filter elements 13, thus tending to prevent leakage at the surfaces between the filter elements and the pressure plates.

Figure 7:
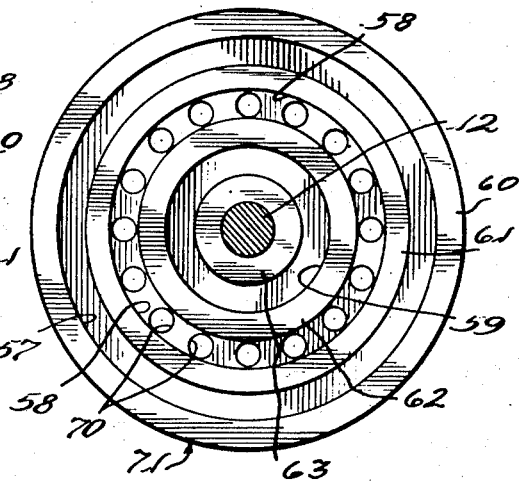
Fig. 7 is a sectional view, taken on the plane of the line 7—7 of Fig. 1, looking in the direction of the arrows, showing the structure of the lowermost or end pressure plate.

The lowermost pressure plate is shown in Fig. 7, and it need not be provided with any grooves on its lower surface, since on that side it does not engage any filter elements; but its upper surface is provided with three grooves 57, 58, 59 for forming the raised lands 60—63, which apply pressure to the filter elements and between their circular series of apertures.

The groove 58 in this case is the only one which is provided with its apertures 70. This lower pressure plate 71 serves to close the series of apertures in the filter assembly which are located at the same radius as the grooves 57 and 59.

The filter elements 13 preferably comprise substantially cylindrical members having the outer cylindrical surface 72, the plane upper surface 73, and the plane lower surface 74.

The filter element has a centrally located bore 75 for passing the screw bolt 12, and each filter element is provided with the series of apertures 76, 77, and 78.

The apertures 76 are arranged at such a radius that they register with the grooves 59 in the usual plates. The apertures 77 are placed at such a radius that they register with the grooves 58 of the pressure plates.

The apertures 78 are located at such a radius that they register with the grooves 57 of the pressure plates.

The diameter of the filter elements is preferably greater than that of the pressure plates so that the cylindrical outer edge 79 of each pressure plate stops short of the outer edge 72 of the filter elements. This leaves an upper annular surface portion 80' and a lower annular surface portion 81' (Fig. 1), and the edge surface 72 of each filter element exposed in the chamber 38, to be used as a filter surface, and greatly increases the amount of filter surface.

The lowermost pressure plate 71 is preferably provided with a nut-retaining member, which may consist of one or more angular members 75' of sheet metal, having an attaching flange 76' secured to the lower plate 71 and having a body flange 77', which extends up into engagement with the flat side 78' of the nut 79.

The nut 79 is threaded on the threaded end 80 of the bolt 12, and a helical compression spring 81 is preferably interposed between the nut 79 and the lower surface of the lower pressure plate 71.

The knurled knob 21 may be turned at any time without opening the housing 14, to increase or decrease the pressure that is placed upon the filter elements by means of the threaded member 12.

When the head 21 is rotated clockwise, the pressure which is already placed upon the assembly by the spring 81 causes a friction which prevents the lower pressure plate from rotating with the bolt. This holds the nut against rotation. The nut progresses upward on the bolt, increasing the pressure on the assembly. This pressure is resiliently exerted by the spring 81 until the spring has its coils tightly pressed against each other, after which still greater pressure may be applied, with the spring acting as a rigid member.

The course of flow of the liquid or gas to be filtered through this filter unit is as follows: The liquid or gas enters at the upper left of Fig. 1 at the inlet 17, and passes into the annular chamber 41 in the lower side of the base member 11. From this annular groove 41 it passes into the chamber 38, which is formed by the cover 14 surrounding the filter assembly.

The liquid or gas to be filtered may then pass into the filter elements at the annular surfaces 80', 81', which project beyond the pressure plates and at the edges 72 of the filter elements so that these surfaces act as filter surfaces, the liquid passing through them into the vertical conduits, which have been indicated in their entirety by the numeral 82.

Liquid may also pass into the filter assembly through the conduits 70 at the lower pressure plate 71, and these conduits lead to the vertical conduits through the assembly, which have been indicated in their entirety by the numeral 83.

The vertical conduits of the filter assembly which are closest to the bolt 12 have been indicated in their entirety by the numeral 84, and they, like the conduit 82, are closed at their lower ends by the bottom pressure plate 71; but they are open at their upper ends through the filter cloth 48 into the space 42 of the base 11, which communicates with the outlet 18.

Thus, the liquid or gas to be filtered that passes in at the lower conduits 70 of the pressure plate 71 into the conduit 83 may pass laterally into the filter elements 13 at the walls of the conduits 70 and may pass through the intermediate parts of these filter elements radially outward and radially inward to reach the conduits 82 and 84 that lead to the outlet 18. In the same way the liquid which came from the outside of the filter assembly tends to pass radially inward toward the conduit 82.

The filter elements may be made of suitable fibrous material, such as discs of cotton felt or wool felt, with the fibers extending in all random directions, and closely matted together so as to provide a more effective filter.

I have found that these filter elements may be cleaned very easily, and they may be operated at relatively high pressure, with a high efficiency. The pressure adjustment is of considerable importance when the filter unit is used in an oil burner fuel system, with a relatively fine nozzle, when the knob may be turned to increase the pressure and tighten the assembly to remove all foreign particles from the fuel; but where a coarse nozzle is used, this additional adjustment need not be employed.

Other forms of filter elements may be made out of sheets of paper, fabrics of cotton, wool, or linen, which may be stapled or otherwise secured together between the holes and out of contact with the lands; that is, the staples would be arranged in the annular circles that are aligned with the grooves.

The pressure plates may be of die cast metal, or they may also be made of pressed paper or other initially plastic material.

In some embodiments of the invention the complete assembly from filter cloth 48 to lower pressure plate 71 may be mounted upon a hollow tube, the ends of which are spun over to make a cartridge. This tube is of sufficient size to receive the bolt 12.

The compression spring 81 serves the purpose of providing a constant resilient pressure on the assembly and making it self-compensating for clogging or on intermittent service and there is no release of the pressure, which might otherwise let the dirt through.

Referring to Figs. 9 and 10, these are views of a modified form of filter in which the filter element assembly is in the form of a unit carried by a hollow tube, as has been described.

In this embodiment of the invention the body member 11 may be of the same construction previously described, except that the hub 40 and wall 39 are provided with the inner plane surfaces 90, 91 for engagement with the gasket 92.

The assembly 13 of filter elements and pressure plates is similar in construction to that previously described, but instead of having an aperture of suitable size for the bolt, the apertures 93 are of sufficient size to receive the tubular metal member 94, upon which the assembly of filter elements and pressure plates is mounted.

This assembly preferably includes the filter cloth 48, which is mounted on the uppermost pressure plate 49, and this pressure plate may be provided with an annular groove 95, which receives the edge of the filter cloth 48 to be engaged by the gasket 92.

A metal washer 96 is mounted on the upper end of the tube 94, and the end of the tube is spun over at 97 to provide a shoulder against which the assembly bears on the tube at this end.

The endmost filter plate 49 may also be spot welded to the tube at 98. At its opposite end the tube 94 is spun over at 99, but all of the pressure plates and filter elements are left free to slide on the tube so that they may be pressed upwardly away from the spun-over portion 99, as shown in Fig. 10.

Instead of having the external knob on the bolt for adjusting the pressure, the body 11 may have a threaded bore 100 for receiving the threaded end 101 of the bolt 102, the bolt being driven home in its threaded bore. The opposite end of the bolt 102 has a threaded portion 103, and the bolt is provided with the nut 104 for clamping the tube 94 in place.

A U-shaped metal stirrup 105 may have its two legs 106, 107 engaged at 108 on the lower pressure plate. This stirrup is provided with an enlarged aperture 109 for passing the threaded portion 103. The external nut 110 bears on the yoke of this stirrup and when the nut 110 is tightened, as shown in Fig. 10, the stirrup places pressure on the filter assembly by urging the lower pressure plate upward.

In this embodiment the filter assembly, comprising the filter elements and pressure plates and their supporting tube, may be removed and replaced as a unit. Such units may be made available for use as spares or for replacements, and much time will be saved in the installation of such a fresh filter assembly over those devices in which the filter elements and pressure plates are separable.

The operation of the present filter will be apparent from the foregoing description of its parts and of the course of the fluid through the filter.

As the filter fills or clogs, its end area is subjected to pressure, which compresses the filter units still further, and keeps the filtrate clear by increased pressure. This action has been observed in the operation of the filter unit, which has keep the filtrate clear, even though the exterior of the filter elements appeared to be covered or clogged, and it was found that the complete filter assembly was one-half inch or more shorter, due to the greater compression of the assembly by the liquid when the filter elements were in this clogged condition.

The present filter assembly gives a greater increased area of primary filtering surface, where the liquid to be filtered passes into the filter elements. For example, on a stack of filter elements of the prior art having an outer diameter of three and three-fourths inches and a length of six and three-eighths inches, it was found that the total filter area was approximately 76.1038 square inches. Upon a filter assembly having a stack of the same outer diameter and length constructed according to the present invention, the total primary filtering area was found to be 134.9384 square inches. This represents an increase of 58.8346 square inches in primary filtering area, which is an important factor in the efficiency of operation of the present device.

It will thus be observed that I have invented a new filter, which provides a greater filtering area than any of the devices of the prior art in a smaller volume. It is, therefore, peculiarly adapted to be used on automotive vehicles or airplanes, or wherever space and weight are important factors.

It is also adapted to be used for oil burners, humidifying devices, or for filtering or purifying any liquids, air, or gases. Its filter elements may be very conveniently replaced, and any sediment which accumulates may be cleaned out of the bottom of the housing 15. The filter elements may be replaced without disturbing the connections to the inlet or outlet; and in the case of an emergency the filter elements may be made by cutting them out of any sheet material, such as felt, cotton, or wool cloth.

The present filter is adapted to be manufactured at a low cost, and the filter assemblies may be removed and replaced as a unit; yet they still permit the adjustment of the pressure on the filter elements by virtue of the sliding action of the plates and filter elements on their tubular support.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a filter assembly, the combination of a supporting body provided with outlet and inlet ports, with a housing member carried by said body, the said housing projecting laterally from one side of said body, said body being provided on the side toward said housing with a conduit communicating with one part and with the housing adjacent its inner face and being provided with another conduit communicating with the other port and communicating with the interior of said housing adjacent the central portion of the housing, said two latter conduits being separated by a wall and said wall being recessed to receive an end plate, said body having a centrally located bore for receiving a threaded member projecting into said housing, a threaded member located in said bore and housing and having a manual actuating member located outside said housing, and a plurality of filter elements and pressure plates carried by said threaded member, the filter elements being located between alternate pressure plates, one of said pressure plates constituting an end plate having apertures communicating with the conduit leading to one of said ports and another of said pressure plates constituting another end plate having apertures communicating with the interior of said housing, all the other pressure plates and the filter elements being provided with a plurality of series of through apertures adapted to communicate with apertures in adjacent filters and pressure plates to form conduits communicating with predetermined apertures in said end plates, the said filters comprising thick fibrous members with the said apertures pre-formed in said filters, the walls of certain of said apertures acting as filtering surfaces.

2. In a filter assembly, the combination of a supporting body provided with outlet and inlet ports, with a housing member carried by said body, the said housing projecting laterally from one side of said body, said body being provided on the side toward said housing with a conduit communicating with one port and with the housing adjacent its inner face and being provided with another conduit communicating with the other port and communicating with the interior of said housing adjacent the central portion of the housing, said two latter conduits being separated by a wall and said wall being recessed to receive an end plate, said body having a centrally located bore for receiving a threaded member projecting into said housing, a threaded member located in said bore and housing and having a manual actuating member located outside said housing, a plurality of filter elements and pressure plates carried by said threaded member, the filter elements being located between alternate pressure plates, one of said pressure plates constituting an end plate having apertures communicating with the conduit leading to one of said ports and another of said pressure plates constituting another end plate having apertures communicating with the interior of said housing, all the other pressure plates and the filter elements being provided with a plurality of series of through apertures adapted to communicate with apertures in adjacent filters and pressure plates to form conduits communicating with predetermined apertures in said end plates, the said filters comprising thick fibrous members with the said apertures pre-formed in said filters, the walls of certain of said apertures acting as filtering surfaces, one of said end plates being provided with means for engaging the sides of a complementary threaded member to prevent rotation of the latter, and a complementary threaded member for placing a thrust on the end plates by rotation of said first mentioned threaded member with said manual means from the exterior of said housing.

3. In a filter assembly, the combination of a supporting body provided with outlet and inlet ports, with a housing member carried by said body, the said housing projecting laterally from one side of said body, said body being provided on the side toward said housing with a conduit communicating with one port and with the housing adjacent its inner face and being provided with another conduit communicating with the other port and communicating with the interior of said housing adjacent the central portion of the housing, said two latter conduits being separated by a wall and said wall being recessed to receive an end plate, said body having a centrally located bore for receiving a threaded member projecting into said housing, a threaded member located in said bore and housing and having a manual actuating member located outside said housing, and a plurality of filter elements and pressure plates carried by said threaded member, the filter elements being located between alternate pressure plates, one of said pressure plates constituting an end plate having apertures communicating with the conduit leading to one of said ports and another of said pressure plates constituting another end plate having apertures communicating with the interior of said housing, all of the other pressure plates and the filter elements being provided with a plurality of series of through apertures adapted to communicate with apertures in adjacent filters and pressure plates to form conduits communicating with predetermined apertures in said end plates, the said filters comprising thick fibrous members with the said apertures pre-formed in said filters, the walls of certain of said apertures acting as filtering surfaces, a fabric filtering member, the end plate located in said recess in said body member engaging said fabric filtering member for removing from the filtered liquid all fine fibrous matter which might come from said filter elements.

4. In a filter assembly, the combination of a supporting body provided with outlet and inlet ports, with a housing member carried by said body, the said housing projecting laterally from one side of said body, said body being provided on the side toward said housing with a conduit communicating with the housing adjacent its inner face and being provided with another conduit communicating with the other port and communicating with the interior of said housing adjacent the central portion of the housing, said two latter conduits being separated by a wall and said wall being recessed to receive an end plate, said body having a centrally located bore for receiving a threaded member projecting into said housing, a threaded member located in said bore and housing and having a manual actuating member located outside said housing, and a plurality of filter elements and pressure plates carried by said threaded member, the filter elements being located between alternate pressure plates, one of said pressure plates constituting an end plate having apertures communicating with the conduit leading to one of said ports and another of said pressure plate constituting another end plate having apertures communicating with the interior of said housing, all the other pressure plates and the filter elements being provided with a plurality of series of through apertures adapted to communicate with apertures in adjacent filters and pressure plates to form conduits communicating with predetermined apertures in said end plates, the said filters comprising thick fibrous members with the said apertures pre-formed in said filters, the walls of certain of said apertures acting as filtering surfaces, said housing comprising a sheet metal member secured to an annular clamping member and a plurality of threaded members for clamping said annular clamping member to said body.

5. In a filter assembly, the combination of a supporting body provided with outlet and inlet ports, with a housing member carried by said body, the said housing projecting laterally from one side of said body, said body being provided on the side toward said housing with a conduit communicating with one port and with the housing adjacent its inner face and being provided with another conduit communicating with the other port and communicating with the interior of said housing adjacent the central portion of the housing, said two latter conduits being separated by a wall and said wall being recessed to receive an end plate, said body having a centrally located bore for receiving a threaded member projecting into said housing, a threaded member located in said bore and housing and having a manual actuating member located outside said housing, and a plurality of filter elements and pressure plates carried by said threaded member, the filter elements being located between alternate pressure plates, one of said pressure plates constituting an end plate having apertures communicating with the conduit leading to one of said ports and another of said pressure plates constituting another end plate having apertures communicating with the interior of said housing, all the other pressure plates and the filter elements being provided with a plurality of series of through apertures adapted to communicate with apertures in adjacent filters and pressure plates to form conduits communicating with predetermined apertures in said end plates, the said filters comprising thick fibrous members with the said apertures pre-formed in said filters, the walls of certain of said apertures acting as filtering surfaces, said threaded member being rotatably mounted in said supporting body and provided with an external actuating head, and a complementary threaded member located beyond said end plate, said end plate having means for preventing rotation of said complementary threaded member, whereby pressure on said filter elements may be regulated from the outside of a filter assembly by turning said actuating head.

WILLIAM W. HALLINAN.

REFERENCES CITED

The following references are of record in the file of this patent:

UNITED STATES PATENTS

| Number | Name | Date |
|---|---|---|
| 730,485 | Simoneton | June 9, 1903 |
| 760,793 | Klein | May 24, 1904 |
| 1,035,248 | Seavey | Aug. 13, 1912 |
| 1,063,006 | Blondiau | May 27, 1913 |
| 1,688,326 | Boulade | Oct. 23, 1928 |
| 1,768,350 | Chase | June 24, 1930 |
| 1,773,797 | Hele-Shaw | Aug. 26, 1930 |
| 1,966,274 | Wells | July 10, 1934 |
| 2,063,742 | Holmes | Dec. 8, 1936 |
| 2,210,397 | Dreiss | Aug. 6, 1940 |
| 2,283,629 | Heftler | May 19, 1942 |
| 2,322,772 | Pennebaker | June 29, 1943 |
| 2,328,131 | Eisler | Aug. 31, 1943 |
| 2,389,431 | Halleman | Nov. 20, 1945 |

FOREIGN PATENTS

| Number | Country | Date |
|---|---|---|
| 4,814 | France | Aug. 7, 1905 |